United States Patent [19]

Schrenk

[11] Patent Number: 5,217,794
[45] Date of Patent: Jun. 8, 1993

[54] LAMELLAR POLYMERIC BODY

[75] Inventor: Walter J. Schrenk, Midland, Mich.

[73] Assignee: The Dow Chemical Company, Midland, Mich.

[21] Appl. No.: 643,611

[22] Filed: Jan. 22, 1991

[51] Int. Cl.⁵ .............................................. B32B 9/00
[52] U.S. Cl. .................. 428/220; 428/912.2; 428/913
[58] Field of Search ............ 428/220, 912.2, 913

[56] References Cited

U.S. PATENT DOCUMENTS

| | | | |
|---|---|---|---|
| 3,556,635 | 1/1971 | Schrenk et al. | 350/96 |
| 3,565,985 | 2/1971 | Schrenk et al. | 264/171 |
| 3,576,707 | 4/1971 | Schrenk et al. | 161/164 |
| 3,632,711 | 1/1972 | Rasmussen | 264/70 |
| 3,711,176 | 1/1973 | Alfrey, Jr. et al. | 350/1 |
| 3,746,607 | 7/1973 | Harmon et al. | 161/109 |
| 3,759,647 | 9/1973 | Schrenk et al. | 425/131 |
| 3,773,882 | 11/1973 | Schrenk | 264/171 |
| 3,884,606 | 5/1975 | Schrenk | 425/133.5 |
| 3,954,933 | 5/1976 | Rasmussen | 264/145 |
| 4,407,871 | 10/1983 | Eisfeller | 428/31 |
| 4,430,284 | 2/1984 | Rasmussen | 264/171 |
| 4,431,711 | 2/1984 | Eisfeller | 428/31 |
| 4,440,709 | 4/1984 | Rasmussen | 264/145 |
| 4,540,623 | 9/1985 | Im et al. | 428/220 |
| 4,713,143 | 12/1987 | Eisfeller | 156/655 |

Primary Examiner—Patrick J. Ryan
Assistant Examiner—Kam F. Lee

[57] ABSTRACT

A lamellar polymeric body which may be reflective and which contains no metals and method of making it are provided. The body can be fabricated and/or postformed into a variety of parts without alteration of its appearance. The body includes discontinuous layers of at least one polymeric material within a matrix of another polymeric material, which polymers differ in refractive index. The layers of the polymeric material may be either optically thick, optically thin, or optically very thin.

28 Claims, 5 Drawing Sheets

LAMELLAR POLYMERIC BODY

CROSS REFERENCE TO RELATED APPLICATIONS

This application is related to U.S. application Ser. No. 463,645, filed Jan. 11, 1990, entitled REFLECTIVE POLYMERIC BODY, now U.S. Pat. No. 5,122,905, issued Jun. 16, 1992, which application is a continuation-in-part of U.S. application Ser. No. 368,695, filed Jun. 20, 1989, entitled REFLECTIVE POLYMERIC BODY now abandoned. This application is also related to U.S. application Ser. No. 466,168, filed Jan. 17, 1990, entitled THICK/VERY THIN MULTILAYER REFLECTIVE POLYMERIC BODY now U.S. Pat. No. 5,122,906, issued Jun. 16, 1992.

BACKGROUND OF THE INVENTION

The present invention relates to a multilayered polymeric body of optically thick, thin, and/or very thin plate-like or ribbon-like layers of one or more polymers within a matrix of another polymer, which body reflects light and can be fabricated to have a silvery or hued (i.e., gold, copper, etc.) metallic appearance, or a nonconventional hued (i.e., blue, green) appearance, or even an iridescent appearance, and to methods of producing such a polymeric body.

Conventional methods for fabricating reflective surfaces include forming such surfaces of highly polished metals. Because of the high costs and fabricating problems involved in using metals, more recently fabricators have used plastic surfaces which contain thin coatings of metal thereon. Thus, metal coated plastic articles are now commonly found as both decorative and functional items in a number of industries. Such articles are used as bright work for consumer appliances such as refrigerators, dishwashers, washers, dryers, radios, and the like. These types of articles are also used by the automotive industry as head lamp reflectors, bezels, radio knobs, automotive trim, and the like.

Typically, such metal coated plastic articles are formed by electroplating or by the vacuum, vapor, or chemical deposition of a thin metal layer on the surface of the article. Additionally, such coatings are subject to the chipping and flaking of the metal coatings as well as corrosion of the metal over time. If additional protective layers must be applied over the metal coating to protect it, additional labor and materials costs are involved. Further, there may be environmental disposal problems with some metal deposition processes.

One such vacuum metallized deposition system to produce bright work and automotive decorative trim is taught by Eisenfeller in U.S. Pat. Nos. 4,713,143, 4,431,711, and 4,407,871. That system deposits minute specular islands of indium metal on a dielectric substrate. The metal is then encapsulated in a clear polymer.

The preparation of multilayer articles of polymers are known, as are methods and apparatuses for making such articles. For example, such multilayered articles may be prepared utilizing multilayer coextrusion devices as described in commonly-assigned U.S. Pat. Nos. 3,773,882 and 3,884,606 to Schrenk. Such devices are capable of simultaneously extruding diverse thermoplastic polymeric materials in continuous layers having substantially uniform layer thicknesses. The number of layers may be multiplied by the use of a device as described in commonly-assigned U.S. Pat. No. 3,759,647 to Schrenk et al.

Im et al, U.S. Pat. No. 4,540,623, teaches a multilayer laminated article which includes a polycarbonate as one of the alternating continuous layers. The articles of Im, however, are intended to be transparent rather than reflective and to exhibit optical properties comparable to a pure polycarbonate polymer.

Alfrey, Jr. et al, U.S. Pat. No. 3,711,176, teaches a multilayered highly reflective thermoplastic body fabricated using thin film techniques. That is, the reflective thin film layers of Alfrey, Jr. et at relied on the constructive interference of light to produce reflected visible, ultraviolet, or infrared portions of the electromagnetic spectrum. Such reflective thin films have found use in decorative items because of the iridescent reflective qualities of the film.

The films of Alfrey, Jr. et al are extremely sensitive to thickness changes, and it is characteristic of such films to exhibit streaks and spots of nonuniform color. Further, color reflected by such films is dependent on the angle of incidence of light impinging on the film. Thus, such films are not practical for uses which require uniformity of reflectivity. Moreover, such films are not practical to thermoform into articles where uniformity of light reflectance is needed as localized thinning of the layers during thermoforming causes alterations in the reflective characteristics of the films.

Moreover, both the Alfrey, Jr. et al films and the multilayer films and articles made up of substantially continuous layers, such as those described in commonly-assigned U.S. Pat. Nos. 5,122,905 and 5,122,906 have some limiting characteristics inherent in their construction. The continuous layers must adhere to themselves to hold the film together. This may necessitate the use of intervening adhesive layers which could adversely affect the optical properties of the film and certainly add to the overall thickness of the film. Further, no gas or other fluid can be permitted at the interface between any of the layers as this may contribute to the delamination of the layers. Additionally, each of the materials used in the layers exerts an effect on the overall mechanical properties of the film. For example, if one of the polymers used is brittle, the layers of brittle material will have an effect on the overall properties of the multilayer film.

Accordingly, there remains a need in the art for a polymeric reflective film, sheet or body which can be fabricated into a variety of parts and which can exhibit a uniform reflective appearance or a silvery iridescent appearance over a range of processing conditions and part geometry. There is also a need for a polymeric reflective film or body which will hold together even if some or all of the individual layers do not, there is a need for a body in which gas or other fluid can be present at layer interfaces without adversely affecting the optical and mechanical properties of the body, and there is a need for a multilayer reflective body which has mechanical properties which are substantially independent of the mechanical properties of at least some of the layers in the body.

SUMMARY OF THE INVENTION

The present invention meets those needs by providing a lamellar reflective polymeric body containing no metals, and a method of making that body which polymeric body can be fabricated and/or post-formed into a variety of parts. In one embodiment of the invention, such fabrication and/or post-forming can be accomplished without alteration of its uniform reflective appearance. The body comprises discontinuous layers of at least one polymeric material within a matrix of another polymeric material which polymers differ in refractive index. The layers of the polymeric material may be either optically thick, optically thin (i.e., iridescent interference layers) or optically very thin. The optically thick layers are too thick to cause visible iridescent effects (visually perceived as a variety of colors), while the very thin layers are too thin to cause such effects. The resulting multilayered lamellar polymeric body, depending upon the layer thicknesses selected, may reflect substantially white light and exhibit a silvery, metallic appearance, or may have bands of iridescent color.

In another embodiment of the invention, where optical properties are not important, the discontinuous multilayer construction provides a number of advantageous mechanical properties. Such properties include high tensile properties in one direction but lower in a direction transverse to the discontinuous ribbon-like layers, the ability to tailor flexibility and ductility into the body, and the ability to include overlapping gas barrier layers into the multilayer construction.

The terms "reflective", "reflectivity", "reflection", and "reflectance" as used herein refer to total reflectance (i.e., ratio of reflected wave energy to incident wave energy) sufficiently specular in nature such that the polymeric body has a metallic appearance. The use of these terms is intended to encompass semi-specular or diffuse reflection such as that of brushed metal, pewter, and the like. In general, reflectance measurement refers to reflectance of light rays into an emergent cone with a vertex angle of 15 degrees centered around the specular angle.

A specific intensity of reflectance, when used herein, is the intensity of reflection which occurs at a wavelength where negligible absorption of light occurs. For example, a silver appearing article reflects substantially all visible wavelengths, whereas the introduction of a dye to achieve other metallic hues will necessarily lower reflectivity of the body at the absorbing wavelengths. Wavelengths unaffected by the dye will be reflected at essentially the same intensity as a non-dyed sample, and it is at these unaffected wavelengths to which the intensity of reflection is referring. Likewise, where optically thin (i.e., iridescent) layers are present, the reflectance referred to is the peak reflectance observed.

In accordance with one aspect of the present invention, a lamellar reflective polymeric body of at least first and second diverse polymeric materials is provided, the body having at least first and second major surfaces. The body includes a plurality of layers of the first polymeric material within a matrix of the second polymeric material, with layers of the first polymeric material having their major interfaces aligned substantially parallel to the major surfaces of the body.

The number of layers of the first polymeric material in the body is sufficient such that at least 30% of light incident on the body is reflected. The individual layers of the first polymeric material in the body and those portions of the second polymeric material sandwiched between the individual layers of the first polymeric material, have an optical thickness of not more than 0.09 micrometers (i.e., are optically very thin), between 0.09 micrometers and 0.45 micrometers (i.e., are optically thin), or not less than 0.45 micrometers (i.e., are optically thick).

In a preferred embodiment of the invention, at least 75% of the individual layers of first polymeric material and those portions of second polymeric material sandwiched between the individual layers of first polymeric material have at least an optical thickness of 0.45 micrometers or greater or 0.09 micrometers or less to produce a uniformly reflective, metallic appearing body. Alternatively, the individual layers of first polymeric material and portions of second polymeric material sandwiched therebetween should have an optical thickness such that no visibly perceived iridescence is reflected from the body. In another embodiment of the invention, a portion or all of the individual layers of first polymeric material and second polymeric material sandwiched therebetween have optical thicknesses in the range of from 0.09 micrometers to 0.45 micrometers to produce a body which has a colored and/or silvery iridescent appearance.

The first and second polymeric materials differ from each other in refractive index by at least about 0.03. To increase the refractive index mismatch at the layer interfaces, and thus increase the reflectance of the body, a fluid such as air may be present at a plurality of the major interfaces of the first and second polymeric materials.

In a preferred embodiment of the invention, the body may comprise from less than one hundred to several thousand layers of the first polymeric material with alternating portions of the second polymeric material therebetween. Increasing the number of layers in the polymeric body has been found to increase its reflectivity (i.e., the percentage of incident light reflected from the body). Thus, by controlling the number of layers, the degree of reflectivity of the article may be controlled.

The reflective body of the present invention may be made up of two or more generally transparent polymer resins. The polymers used in the practice of the present invention may be rigid or elastomeric, or have varying degrees of flexibility. Preferred are thermoplastic resins which are capable of being post formed into a variety of shapes. For example, in one embodiment of the invention, the first polymeric material may be polymethyl methacrylate and the second polymeric material may be polystyrene.

Where the reflective body is used in a situation requiring gas impermeability, the first polymeric material may be a gas barrier material. The many overlapping layers in the body create an effective barrier to the passage of gases. For example, suitable barrier layer materials such as copolymers of ethylene and vinyl alcohol, polyvinylidene chloride, nitrile polymers, and nylons may be used in the multilayer body.

The layers of the first polymeric material may be present in the form of elongated, flat, ribbon-like layers which are substantially continuous in a first plane parallel to one of the major surfaces of the body and discontinuous in a second plane transverse to the first plane. Alternatively, the layers of the first polymeric material may be present in the form of platelet-like layers which are substantially discontinuous along planes generally parallel and transverse to one of the major surfaces of the body.

In some embodiments of the invention it may be desirable to incorporate coloring agents such as dyes or pigments into one or more of the individual interior layers of the polymeric body or into the continuous polymeric matrix of the body. The coloring agents may be selected to give the polymeric body a metallic appearance other than its normal silvery appearance such as bronze, copper, or gold, for example.

Different colors such as black, blue, red, yellow, white, and the like may also be used. Typically, it is most desirable to use pigmented coloring agents in the interior layers to provide opaqueness and a two-sided mirror-like reflective quality and to use dyes for the continuous matrix portion of the body. Coloring agents may be used in combination to provide desirable coloring and optical properties. For example, a pigmented white coloring agent may be used in an interior layer while a colored dye, such as blue, yellow, red, or green may be included in the continuous polymeric matrix to provide a unique reflective colored effect.

Further, while in certain embodiments of the invention the surface of the body is smooth to give a highly reflective appearance, in some instances it may be desirable to give the surface of the body a roughened or brushed appearance to simulate a brushed metallic appearance. Further, a solvent may be used to etch the surface of the multilayer body to provide a matte or pewter look to the body. Additionally, the body may be embossed with a variety of patterns to provide desirable optical effects.

In another embodiment of the invention, the interior layers of the reflective body may include layers of two or more different polymers in a matrix of a third polymer. Thus, a lamellar reflective polymeric body of at least first and second diverse polymeric materials is provided, the body having at least first and second major surfaces. The body comprises a plurality of individual layers within a matrix of a third polymeric material, with each individual layer comprising at least three or more alternating layers of the first and second polymeric materials within the matrix.

The alternating layers of the first and second polymeric materials have their major interfaces aligned substantially parallel to the major surfaces of the body, with the number of alternating layers of the first and second polymeric materials being sufficient such that at least 30% of light incident on the body is reflected. In a preferred embodiment, the individual layers of the first and second polymeric materials have optical thicknesses of not more than 0.09 micrometers (i.e., are optically very thin), between 0.09 micrometers and 0.45 micrometers (i.e., are optically thin), or not less than 0.45 micrometers (i.e., are optically thick). The first and second polymeric materials differ from each other in refractive index by at least about 0.03.

In one alternative construction, at least 75% of the individual layers of the first and second polymeric materials have an optical thickness of at least 0.45 micrometers to produce a uniformly reflective, metallic-appearing body. In another embodiment of the invention, a portion or all of the individual layers of first polymeric material and second polymeric material sandwiched therebetween have optical thicknesses in the range of from 0.09 micrometers to 0.45 micrometers to produce a body which has a colored and/or silvery iridescent appearance.

Again, the polymers making up the various layers of the body may be chosen to give the body specific mechanical or optical properties. For example, the third polymeric material which makes up the continuous matrix may be elastomeric to produce a flexible reflective body. Polymers may be selected to provide a reflective body which is post formable and/or thermoformable. Also, coloring agents such as pigments or dyes may be incorporated into one or more of the polymeric materials as previously described. Reflectivity of the body may be controlled by controlling the number of layers of polymers in the body. Preferably, the body comprises from less than one hundred to several thousand layers of the first and second polymeric materials.

Again, in one variation of this embodiment of the invention, the layers of the first and second polymeric materials are substantially continuous in a first plane parallel to one of the major surfaces of the body and discontinuous in a second plane transverse to the first plane to form elongated ribbon-like elements. In another variation, the layers of the first and second polymeric materials are substantially discontinuous along planes parallel and transverse to one of the major surfaces of the body to form platelet-like elements.

The reflective polymeric body of the present invention may also be fabricated to act as a birefringent light polarizer which polarizes a broad band of the electromagnetic spectrum. The polarizer is fabricated of at least first and second diverse polymeric materials, with the body having at least first and second major surfaces. The body includes a plurality of layers of the first polymeric material within a matrix of the second polymeric material, with the layers of the first polymeric material having their major interfaces aligned substantially parallel to the major surfaces of the body.

The number of layers of the first polymeric material is sufficient such that at least 30% of light incident on the polarizer is reflected in the plane of polarization. The individual layers of the first polymeric material and those portions of the second polymeric material sandwiched between individual layers of the first polymeric material have an optical thickness of not more than 0.09 micrometers or at least 0.45 micrometers, with the first and second polymeric materials differing from each other in refractive index by at least about 0.03 in one plane of the polarizer. In a preferred embodiment, the difference in refractive index between the first and second polymeric materials is caused by selecting polymers having differing stress optical coefficients and then stretching those materials in a uniaxial direction to orient the polymeric materials.

The unique arrangement of layers of diverse polymeric materials may also provide a useful body even where reflective properties are not required. The arrangement of discontinuous layers of one polymer in a continuous matrix of another polymer permits the fabrication of bodies which have physical properties which are controllable and substantially independent of the materials used for the discontinuous layer. Additionally, because of the continuous matrix of the second polymer surrounding the layers, delamination of the first and second polymers at their respective interfaces does not adversely affect the overall body; catastrophic delamination of the body does not occur.

Accordingly, for this embodiment of the invention, a lamellar polymeric body of at least first and second diverse polymeric materials is provided, with the body having at least first and second major surfaces. The body includes a plurality of layers of the first polymeric material within a matrix of the second polymeric material. Further, the layers of the first polymeric material are substantially discontinuous along planes parallel and/or transverse to one of the major surfaces of the body to form platelet-like elements. The layers of the first polymeric material may have their major interfaces aligned substantially parallel to the major surfaces of the body, although this is not necessary.

For example, the polymeric body may be fabricated so that the first polymeric material is rubbery (or elastomeric) and the second polymeric material is brittle. This results in a polymeric body which has greater flexibility than one fabricated of the second polymeric material alone. Alternatively, both polymeric materials may be elastomers. If the matrix polymer is elastomeric and the first polymeric material is not, the body still possesses elastomeric properties. Where the first polymer is in the form of discontinuous platelet-like elements, the body retains elastomeric properties in all directions.

The present invention also provides a method for the production of a lamellar reflective polymeric body comprising the steps of providing a first stream of a first heat plastified polymeric material and a second stream of a second heat plastified polymeric material, and encapsulating discrete portions of the first polymeric material in the second polymeric material by coextruding the polymeric materials to form a plurality of discontinuous ribbon-like layers of the first polymeric material within a matrix of the second polymeric material to form the reflective polymeric body. The discontinuous layers of the first polymeric material are arranged to have their major interfaces aligned substantially parallel to the major surfaces of the body such that at least 30% of light incident on the body is reflected. The individual layers of the first polymeric material in the body, and those portions of the second polymeric material sandwiched between the individual layers of the first polymeric material, have an optical thickness of not more than 0.09 micrometers, between 0.09 micrometers and 0.45 micrometers, or not less than 0.45 micrometers, and the first and second polymeric materials differ from each other in refractive index by at least about 0.03.

The ribbon-like layers may be further divided into a series of platelet-like layers to produce layers which are discontinuous in all major planar dimensions. This step of dividing the ribbon-like layers into platelet-like layers may be accomplished, for example, by passing the ribbon-like layers through a reciprocating feed plate or valve.

In an alternate embodiment of the invention, a method for the production of a lamellar reflective polymeric body is provided comprising the steps of providing a first stream of a first heat plastified polymeric material and a second stream of a second heat plastified polymeric material. The polymeric materials are coextruded to form alternating layers of the first and second polymeric materials, and then individual ones of the alternating layers of the first and second polymeric materials are encapsulated in a third polymeric material to form a plurality of discontinuous ribbon-like elements of the alternating layers of the first and second polymeric materials within a matrix of the third polymeric material to form the reflective polymeric body. The alternating layers of the first and second polymeric materials have their major interfaces aligned substantially parallel to the major surfaces of the body such that at least 30% of light incident on the body is reflected, with the individual layers of the first and second polymeric materials having optical thicknesses of not more than 0.09 micrometers, or between 0.09 micrometers and 0.45 micrometers, or not less than 0.45 micrometers. The first and second polymeric materials differ from each other in refractive index by at least about 0.03.

The ribbon-like elements may be further divided into a series of platelet-like elements to produce elements which are discontinuous in all major planar dimensions. This may be accomplished by dividing the ribbon-like elements into platelet-like elements is by passing the ribbon-like elements through a reciprocating feed plate or valve.

In yet an additional embodiment of the invention, a method for the production of a lamellar reflective polymeric body is provided including the steps of, providing a first stream of a first heat plastified polymeric material and a second stream of a second heat plastified polymeric material. Alternating slugs of the first and second polymeric materials are then fed to a flow passage where the slugs are formed into discontinuous alternating layers of the first and second polymeric materials due to the viscosities of the polymers flowing through the passage. Individual ones of the alternating layers of the first and second polymeric materials are then encapsulated in a third polymeric material to form a plurality of discontinuous ribbon-like elements of the alternating layers of first and second polymeric materials within a matrix of the third polymeric material to form the reflective polymeric body. The alternating layers of the first and second polymeric materials have their major interfaces aligned substantially parallel to the major surfaces of the body such that at least 30% of light incident on the body is reflected, with the individual layers of the first and second polymeric materials having optical thicknesses of not more than 0.09 micrometers, between 0.09 micrometers and 0.45 micrometers, or not less than 0.45 micrometers. The first and second polymeric materials differ from each other in refractive index by at least about 0.03.

The feeding alternating slugs of the first and second polymeric materials to a flow passage is accomplished by passing the first and second polymeric materials through a reciprocating valve. The frequency of reciprocation of the valve is controlled to control the size of the alternating layers.

Accordingly, it is an object of the present invention to provide a polymeric reflective film or body which will hold together even if some or all of the individual layers do not, to provide a body in which gas or other fluid can be present at layer interfaces without adversely affecting the optical and mechanical properties of the body, and to provide a multilayer reflective body which has mechanical properties which are substantially independent of the mechanical properties of at least some of the layers in the body. Still further, it is an object of the present invention to provide silvery or metallic appearing articles which do not use metal. These, and other objects and advantages of the present invention will become apparent from the following detailed description, the accompanying drawings, and the appended claims.

DETAILED DESCRIPTION OF THE PREFERRED EMBODIMENTS

The present invention provides a highly reflective lamellar multilayer polymeric body made up of from less than a hundred to several thousand layers of at least one polymer within a matrix of another polymer, which polymers differ from each other in refractive index. The individual layers of the polymeric material have an optical thickness of not more than 0.09 micrometers, between 0.09 micrometers and 0.45 micrometers, or not less than 0.45 micrometers, where the optical thickness is defined as the product of the individual layer thickness times the refractive index of the polymeric material which makes up that layer.

Thus, in its preferred form, the lamellar multilayer reflective polymeric body of the present invention is made up of multiple optically thick and/or optically thin and/or optically very thin layers. For purposes of optical properties, i.e., reflectance and transmittance, an optically thin film can be described as a film thinner than one wavelength of light at which the film will be applied. Thus, for films to be used in the visible wavelength band, a thin film is described in the literature as one whose thickness, D, is less than about 0.5 micrometer or whose optical thickness, ND (where N is the refractive index of the material) is less than about 0.7 micrometers. Vasicek, *Optics of Thin Films* (1960) at pages 100 and 139.

Thin film layer articles describe iridescent interference films which rely on the constructive optical interference of light to produce intense reflected light in the visible, ultraviolet, or infrared portions of the electromagnetic spectrum according to the equation:

$$\lambda_m = \left(\frac{2}{m}\right)(N_1 D_1 + N_2 D_2)$$

where $\lambda_m$ is the reflected wavelength in nanometers, $N_1$ and $N_2$ are the refractive indices of the alternating polymers, $D_1$ and $D_2$ are the thickness of the respective layers of polymers in nanometers, and m is the order of reflection (m=1,2,3,4,5). This is the equation for light incident normal to the surface of the film. For other angles of incidence, the equation will be modified to take into account the angle, as is known in the art. Each solution of the equation determines a wavelength at which an intense reflection, relative to surrounding regions, is expected. The intensity of the reflection is a function of the "f-ratio" where, $$f = \frac{N_1 D_1}{N_1 D_1 + N_2 D_2}$$

By proper selection of the f-ratio, one can exercise some degree of control over the intensity of reflection of the various higher order reflections. For example, first order visible reflections of violet (0.38 micrometer wavelength) to red (0.68 micrometer wavelength) can be obtained with layer optical thicknesses between about 0.075-0.25 micrometers. Iridescent films may also be designed to reflect visible light at higher order reflectances, although at lower intensities.

As can be seen, such thin film polymeric bodies are strongly dependent upon film (and individual layer) thickness to determine reflected wavelength. Such thin films are extremely sensitive to thickness changes, and it is characteristic of such thin films to exhibit nonuniform streaks and spots of color. Thus, for certain embodiments of the invention which utilize optically thin layers, the body will exhibit colored or silvery iridescence. By designing the layer thicknesses so that there is a gradient in optical thicknesses across the layers, a broad-band reflecting, silvery iridescent polymeric body may be produced.

In other embodiments of the invention, the multilayer bodies are designed so that they do not display the vivid iridescence which is displayed when using optically thin layers. The use of layers too thick or too thin to cause iridescence, alone or in combination with each other result in a reflection which is essentially silver and non-iridescent. This silvery appearance is due to higher order reflections from the thick and/or very thin layers being so closely spaced that the human eye perceives the reflection to be essentially non-iridescent.

The optical thickness range which is avoided by this embodiment of the invention is $$\lambda/4 < nd < 5\lambda/4$$

where, $\lambda$ = approximately 0.38 micrometers, n = refractive index of the polymer, and d = physical thickness of the layer in micrometers. Thus, in the practice of this embodiment of the invention, a substantial majority of the thick layers have an optical thickness (nd) of greater than $5\lambda/4$, while a substantial majority of the very thin layers have an optical thickness of less than $\lambda/4$.

Articles made in accordance with this embodiment of the invention exhibit a uniform silvery reflective appearance. The reflective characteristics of the multilayer bodies of this embodiment of the invention are governed by the following equation:

$$R = \frac{kr}{(1 + (k - 1)r)} \times 100$$

where R is the amount of reflected light (%), k is the number of thick film layers, and $r = [(N_1 - N_2)/(N_1 + N_2)]^2$. See Vasicek, *Optics of thin Films* (1960) at pages 69-70.

This equation indicates that the intensity of the reflected light, R, is a function only of r and k, where r and k are defined as above. As a close approximation, R is a function only of the refractive index mismatch of the two polymer components and the total number of layer interfaces. This relationship contrasts greatly with that of optically thin film articles whose reflectivity is highly sensitive to layer thickness and angle of view.

Thus, the reflected wavelength of light from this embodiment of the multilayer polymeric body of the present invention is independent of both individual layer and total structure thickness over a wide processing range. Uniformity of reflection is inherent in the design of the body. Moreover, a gradient of layer thicknesses through the thickness of the body is neither detrimental nor advantageous to the appearance of the body as long as a substantial majority of the individual layers of the polymers maintains an optical thickness equal to or greater than about 0.45 micrometers or equal to or less than 0.09 micrometers. This again contrasts with the optically thin film embodiment of the invention which reflects broad or narrow bandwidths depending upon layer thickness gradient.

The preferred coextrusion process for fabricating the polymeric bodies of the present invention may introduce layer thickness variations both through the thickness of the body and in the plane of individual layers. Variation in layer thicknesses of each polymeric component can be as much as 300% or more. However, useful reflective bodies and articles may be made even with such wide variations as long as a substantial majority of the layers have an optical thickness of not more than 0.09 micrometers or not less than 0.45 micrometers. With this condition met, there is an absence of visibly perceived interference colors reflected from bodies and articles of this embodiment of the present invention.

The absence of the iridescent interference colors is somewhat subjective to the human eye. However, we have found that about 75% of the layers in the body should have optical thicknesses greater than 0.45 micrometers or less than 0.09 micrometers to obtain the broad band, visually uniform reflectance of substantially all wavelengths (white light) which characterizes this embodiment of the present invention. A minority of about 25% or fewer of the layers having optical thicknesses in the range of 0.1 to 0.45 micrometers have been found to have interference reflections of a sufficiently low intensity so that the body will have essentially no visibly perceived iridescence.

The reflective polymeric bodies of the present invention become more highly reflective of incident light (i.e., transmit less light) as the number of layers is increased. Preferably, the number of layers is sufficient to produce an article which will reflect at least 30% of the incident light, for those wavelengths for which there is negligible absorption. Reflectances below about 30% are not sufficient to be readily observed. If it is desired to use the reflective polymeric body of the present invention as a mirror, adding additional layers will increase the reflectance of the body to 50% or higher to produce a silvery, mirror-like appearance.

The reflectivity of the bodies is also dependent upon the difference in refractive index between the two polymers used. That is, the greater the difference in refractive index, the greater the reflectivity of the body. Accordingly, it can be seen that the reflective nature of the polymeric bodies may be controlled by the selection of polymers having differing refractive indices and by fabricating the body to have additional layers.

The reflective multilayered polymeric bodies of the present invention may comprise alternating layers of a wide variety of generally transparent thermoplastic materials. Suitable thermoplastic resins, along with representative refractive indices, which may be used in the practice of the present invention include, but are not limited to: perfluoroalkoxy resins (refractive index=1.35), polytetrafluoroethylene (1.35), fluorinated ethylene-propylene copolymers (1.34), silicone resins (1.41), polyvinylidene fluoride (1.42), polychlorotrifluoroethylene (1.42), epoxy resins (1.45), poly(butyl acrylate) (1.46), poly(4-methylpentene-1) (1.46), poly(vinyl acetate) (1.47), ethyl cellulose (1.47), polyformaldehyde (1.48), polyisobutyl methacrylate (1.48), polymethyl acrylate (1.48), polypropyl methacrylate (1.48), polyethyl methacrylate (1.48), polyether block amide (1.49), polymethyl methacrylate (1.49), cellulose acetate (1.49), cellulose propionate (1.49), cellulose acetate butyrate (1.49), cellulose nitrate (1.49), polyvinyl butyral (1.49), polypropylene (1.49), polybutylene (1.50), ionomeric resins such as Surlyn (trademark) (1.51), low density polyethylene (1.51), polyacrylonitrile (1.51), polyisobutylene (1.51), thermoplastic polyesters such as Ecdel (trademark) (1.52), natural rubber (1.52), perbunan (1.52), polybutadiene (1.52), nylon (1.53), polyacrylic imides (1.53), poly(vinyl chloro acetate) (1.54), polyvinyl chloride (1.54), high density polyethylene (1.54), copolymers of methyl methacrylate and styrene (1.54), transparent acrylonitrile-butadiene-styrene terpolymer (1.54), allyl diglycol resin (1.55), blends of polyvinylidene chloride and polyvinyl chloride such as Saran resins (trademark) (1.55), polyalpha-methyl styrene (1.56), styrene-butadiene latexes such as Dow 512-K (trademark) (1.56), polyurethane (1.56), neoprene (1.56), copolymers of styrene and acrylonitrile such as Tyril resin (trademark) (1.57), copolymers of styrene and butadiene (1.57), polycarbonate (1.59), other thermoplastic polyesters such as polyethylene terephthalate and polyethylene terephthalate glycol (1.60), polystyrene (1.60), polyimide (1.61), polyvinylidene chloride (1.61), polydichlorostyrene (1.62), polysulfone (1.63), polyether sulfone (1.65), and polyetherimide (1.66). The refractive indices reported above may vary somewhat at different wavelengths. For example, the refractive index of polycarbonate is somewhat greater for light in the blue region of the spectrum and somewhat lower for light in the red region of the spectrum.

Copolymers of the above resins are also useful such as hydrolyzed ethylene vinyl acetate, styrene and hydroxy ethylacrylate, styrene and maleic anhydride, styrene-butadiene block copolymers, styrene and methyl methacrylate, and styrene and acrylic acid. Other useful polymeric materials include polyetheretherketones, polybutene, maleic anhydride grafted polyolefins such as Admer (available from Mitsui Chemicals) and Plexar (available from Quantum Chemicals), and copolymers of ethylene and vinyl acetate such as CXA (available from du Pont). The latter three polymers are particularly useful as adhesive layers to bond other polymeric layers together in the multilayer construction.

A condition for the selection of the polymers to make up the layers and matrix of the body is that the polymers selected have refractive indices which differ from each other by at least about 0.03. Further, the polymers should be compatible in processing temperatures so that they may be readily coextruded.

Multilayer bodies in accordance with the present invention are most advantageously prepared by employing principles similar to those described in U.S. Pat. Nos. 3,565,985, 3,759,647, 3,773,882, and 3,884,606, with respect to multilayer coextrusion, the disclosures of which are incorporated herein by reference. Such devices are capable of providing substantially continuous multilayered, simultaneously extruded thermoplastic materials having controllable layer thicknesses.

Figure 1:
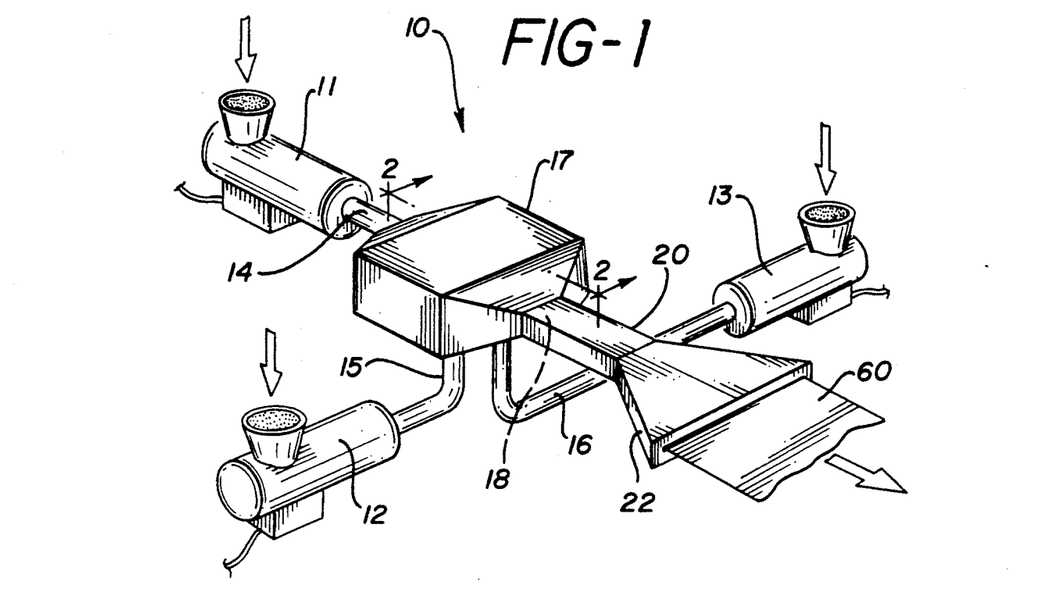
FIG. 1 is a schematic representation of the apparatus for preparing the polymeric body of the present invention.

An apparatus for carrying out one embodiment of the process of the present invention is illustrated in FIG. 1. There, an apparatus 10 for the preparation of the multilayer polymeric body of the present invention is depicted. Apparatus 10 includes, in cooperative combination, first, second, and optional third sources of heat plastified polymeric resins for extruders 11, 12, and 13, respectively. Optional third source of polymer resin is used when it is desired that the first and second polymers adhere to each other in the final polymeric body. Thus, a "glue" layer of a third polymer may be interposed between the first and second polymers as explained in further detail below.

Extruders 11, 12, and 13 discharge the heat plastified polymeric resins into conduits 14, 15, and 16, respectively. A coextrusion feedblock die 17 is in operative combination with conduits 14, 15, and 16 and receives first, second, and optional third heat plastified streams therefrom. Die 17 defines an extrusion orifice 18 from which issues a composite stream of polymeric material having ribbon-like layers of a first polymeric material embedded within a matrix of a second polymeric material. Optionally, the first and second polymers may be adhered together by a "glue" layer of a third polymer.

From orifice 18, the composite stream passes optionally through a mechanical manipulating section 20 which serves to rearrange the original ribbon layers in a matrix composite stream into a stream having more than the original number of ribbon layers as taught in the aforementioned U.S. Pat. Nos. 3,565,985 and 3,759,647. Additional manipulating sections may be arranged in series to further multiply the number of layers in the stream.

The number of additional ribbon layers created using the manipulation devices of the aforementioned patents is determined by the number of ribbon layers divided by the layer-dividing vane in those devices. Ribbon layers not cut by the dividing vane are not multiplied. This is in contrast to a substantially continuous multilayer construction in which all layers are cut by the dividing vane. The interfacial area of each ribbon is increased in the lateral spreading region of the mechanical manipulating devices. For each layer multiplication stage, the width of the ribbon layers is doubled and the thickness is halved, for polymers having reasonably matched viscosities. Where the ribbon layers have a higher viscosity than the matrix polymer, there will be a correspondingly lesser change in the shape of the ribbon layers after manipulation.

The multilayered stream is then passed into a shaping die 22 which is so constructed and arranged that streamlined flow is maintained therein. Such an extrusion die is described in U.S. Pat. No. 3,557,265, the disclosure of which is incorporated by reference herein. While a sheet or film forming die 22 is illustrated, it will be appreciated by those skilled in the art that a forming die of any desired configuration may be use to extrude not only films and sheets, but also other profiles and shapes.

The configuration of the shaping die can vary and can be such as to reduce the thickness of each of the ribbon-like layers. The precise degree of reduction in thickness of the ribbon-like layers delivered from the mechanical orienting section, the configuration of the die, and the amount of mechanical working of the body after extrusion are all factors which affect the thickness of the individual layers in the final body.

Figure 2:
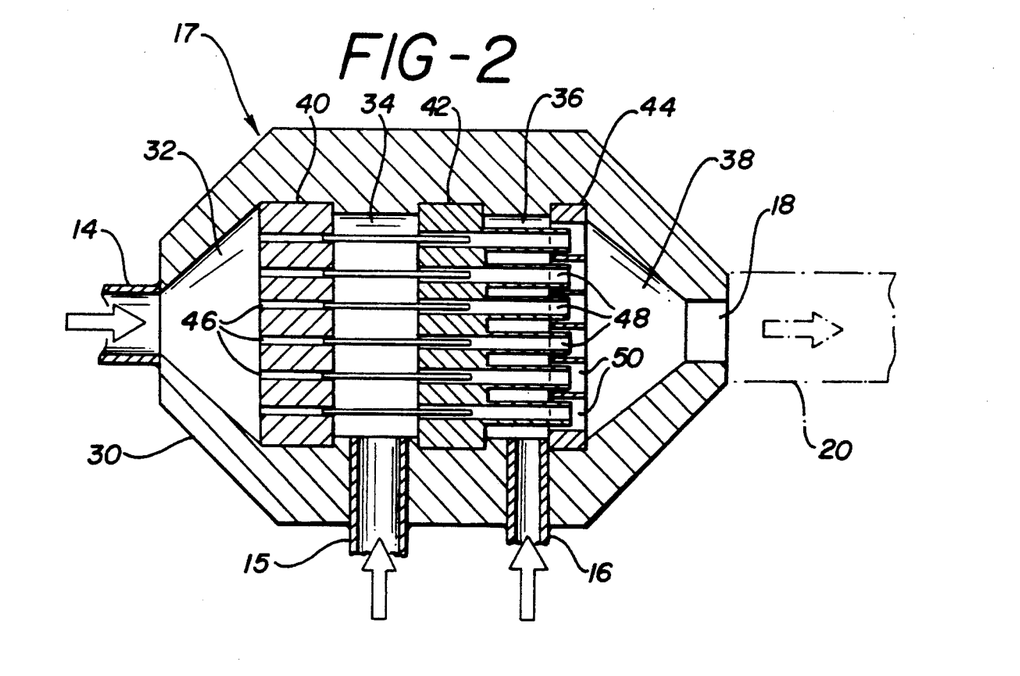
FIG. 2 is a sectional side view of a die suitable for use in the preparation of the polymeric body of the present invention.

FIG. 2 depicts schematically a sectional view of die 17 suitable for the production of the polymeric body of the present invention. Die 17 comprises a die body 30 defining a first inlet plenum 32 in operative communication with a first polymer source through conduit 14. Die body 30 also defines a second or intermediate polymer plenum 34 in operative communication with a second polymer source through conduit 15. An optional third plenum 36 is defined by die body 30 and is in operative communication with an optional source of polymer through conduit 16. Where an adhesive layer is desired to bond together the first and second polymers, the adhesive polymer is supplied to second plenum 34, while the second polymer is supplied from conduit 16 to optional third plenum 36. Remote from inlet plenum 32, discharge plenum 38 terminates in discharge orifice passage 18.

A first dividing means 40 is disposed between inlet plenum 32 and second plenum 34. A second dividing means 42 is disposed between second plenum 34 and third plenum 36. An optional third dividing means is disposed between third plenum 36 and discharge plenum 38. First dividing means 40 has a plurality of passages 46 which provide communication between inlet plenum 32 and a location within second dividing means 42. The passages 46 may be either round, square, or rectangular in cross section and arranged in either rows or staggered arrays.

Second dividing means 42 has a plurality of passages 48 which provide communication between second plenum 34 and a location within optional third dividing means 44. Again, the passages may be either round, square, or rectangular in cross section, and may be arranged in either rows or staggered arrays. Optional third dividing means 44 also has a plurality of passages 50 which provide communication between third plenum 36 and discharge plenum 38.

In operation of the die depicted in FIG. 2, a first heat plastified polymeric resin is supplied through conduit 14 into inlet plenum 32. From plenum 32, the polymeric material flows through passages 46 and is discharged within passages 48. A second heat plastified polymeric resin is supplied through conduit 15 into intermediate plenum 34. The second polymer flows through passages 48 around the discharge points of the first polymeric material and encapsulates the ribbons of the first polymer in a continuous matrix.

Where an intermediate "glue" or adhesive layer is desired, the adhesive polymer is supplied through conduit 15 into intermediate plenum 34, and the second heat plastified polymer is supplied through conduit 16 into third plenum 36. In this embodiment, the second polymer flows around and encapsulates ribbons of the first polymer, now coated with a layer of an adhesive polymer, and encapsulates the two in a continuous matrix.

By maintaining the total extrusion rate so that turbulence does not occur in the plenums, a composite stream made up of multiple ribbon-like layers of a first polymer in a continuous matrix of a second polymer is formed and discharges through orifice 18. After further optional mechanical manipulation in section 20 to further increase the number of layers as previously described, the composite polymer stream is discharged through shaping die 22 to form a polymeric body as illustrated in FIG. 3.

Figure 3:
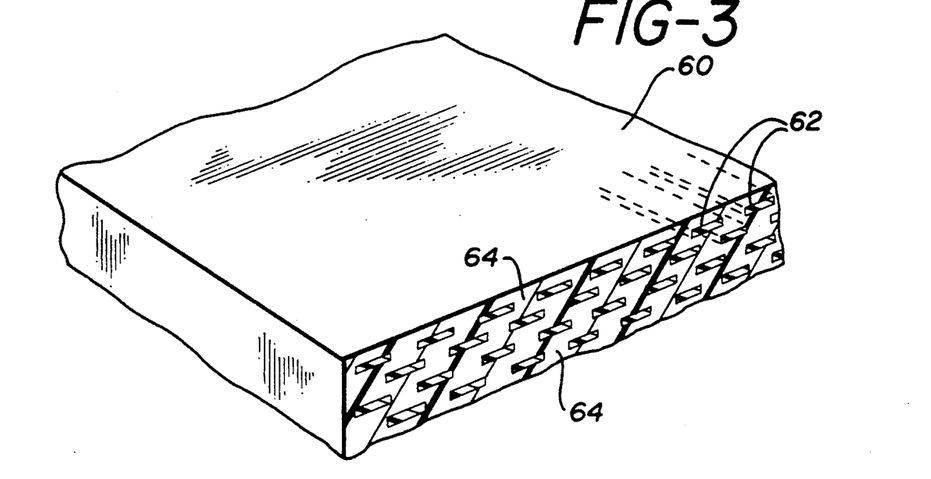
FIG. 3 is a perspective view of one embodiment of the polymeric body as it emerges from a sheeting die.

As shown in FIG. 3, the polymeric body 60 includes a plurality of layers of a first polymeric material in the form of substantially continuous ribbons 62 embedded in a matrix 64 of a second polymer. As shown, the ribbons are substantially continuous in a first plane parallel to a major horizontal surface of the body and are discontinuous in a plane transverse thereto. The cross sectional shape and dimensions of the ribbons 62 are determined by the relative flow rates, the flow patterns within the manipulating section, and the shaping die as well as the viscosity and elasticity of the polymers and their interfacial tension.

Spreading flow in the manipulating section or within the shaping die increases the width of the ribbons and decreases their thickness. Velocity profiles within the dies and layer multiplication sections of the apparatus may affect the shape of the edges of the ribbons.

In a preferred embodiment of the invention, a reflective multilayered polymeric body is produced which reflects at least 30% of the light incident thereon. The thicknesses of the layers of first polymeric material and those portions of the second polymeric material sandwiched between layers of the first polymeric material are controlled so that the individual layers of first polymeric material and portions of second polymeric material therebetween have an optical thickness of not more than 0.09 micrometers, optical thicknesses between 0.09 micrometers and 0.45 micrometers, or optical thicknesses not less than 0.45 micrometers. The first and second polymeric material have refractive indices which differ by at least about 0.03.

In another embodiment of the invention, the ribbons 62 themselves may comprise a microlayer structure of alternating first and second polymeric materials, with the individual layers having optical thicknesses of not more than 0.09 micrometers, between 0.09 micrometers and 0.45 micrometers, or not less than 0.45 micrometers as desired. The first and second polymeric material have refractive indices which differ by at least about 0.03. In this embodiment of the invention, the polymeric body will comprise multiple overlapping layers of ribbons having layers of alternating first and second polymeric materials embedded in a matrix of a third polymer. The microlayer stream may be created by using the techniques taught in the aforementioned U.S. Pat. Nos. 3,565,985, 3,759,647, 3,773,882, and 3,884,606.

The controlled ribbon-like morphology of the polymeric body of the present invention, whether comprising ribbons of single polymers or multilayered ribbons, results in a structure having many useful anisotropic properties. Because the many overlapping ribbons are continuous in the extrusion direction of the body, but discontinuous in the transverse direction, tensile properties of the body may be high in the extrusion direction but lower in the transverse direction if suitable polymers are selected. If ribbons are made from liquid crystalline polymers such as those polymers available from Celanese Corporation under the designation Vectra, very high tensile properties in the extrusion direction are obtained. Further, the matrix polymer embedding the ribbons prevents catastrophic delamination.

Figure 4:
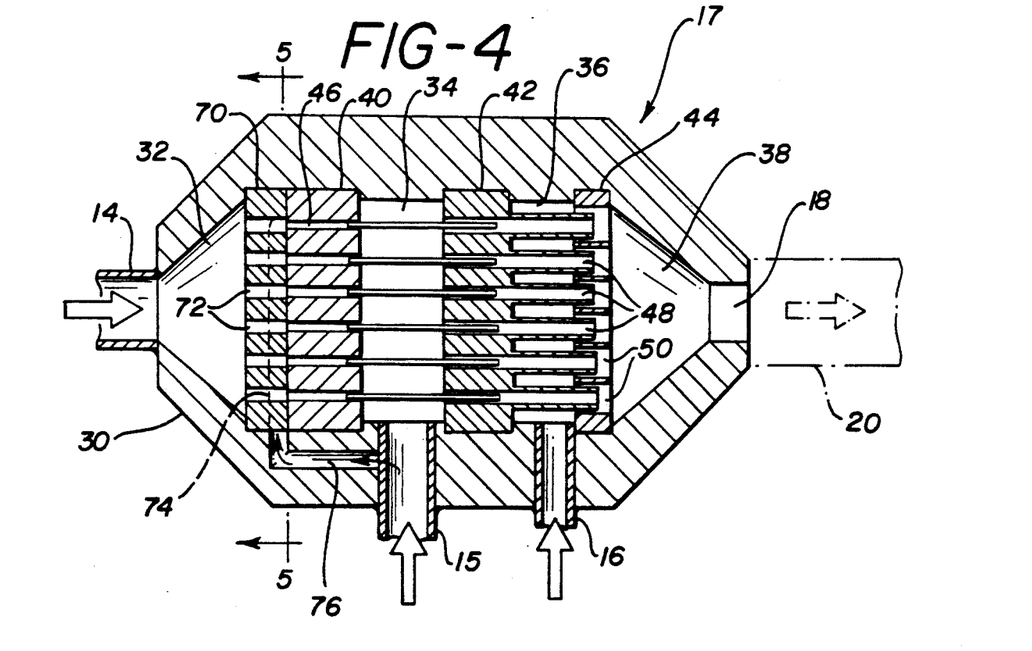
FIG. 4 is a sectional side view of a die suitable for use in the preparation of another embodiment of the polymeric body of the present invention.
Figure 4A:
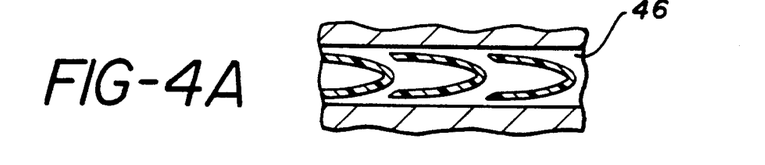
FIG. 4A is a sectional view of the distortion of layer interfaces of the first and second polymers flowing in the passages.
Figure 5:
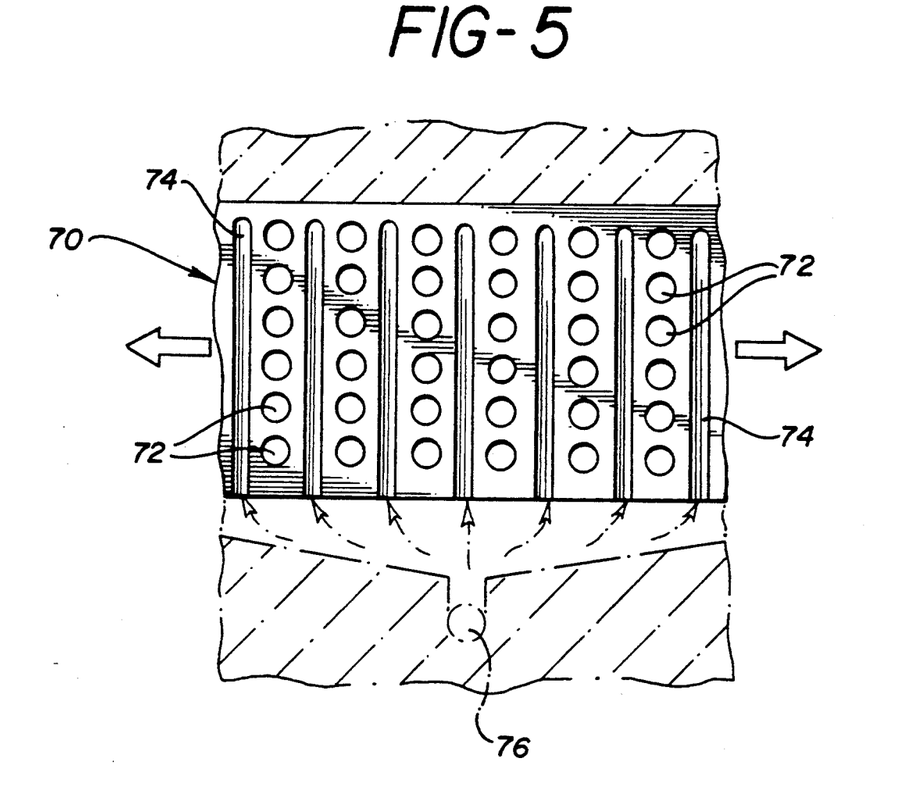
FIG. 5 is a front view of the reciprocating feed plate taken along line 5—5 in FIG. 4.

In a further embodiment of the invention illustrated in FIG. 4, where like reference numerals represent like elements, a polymeric body having ribbons which are lamellar in cross section may also be produced by positioning a reciprocating valve or feed plate 70 ahead of first dividing means 40 in die body 30. Reciprocating feed plate 70 comprises a series of alternating holes 72 and slots 74 as best seen in FIG. 5. Holes 72 are in communication with the first polymer stream in plenum 32. Slots 74 are in communication with the second polymer stream entering intermediate plenum 34 through conduit 76. As feed plate 72 is reciprocated (by conventional means not shown) back and forth, passages 46 are alternately fed "slugs" of the first and second polymer. Because of the viscosity of the polymers, there will be a parabolic velocity profile within passages 46 which will distort the interfaces between the polymers into a layered structure as shown in FIG. 4A. Frequency of the reciprocation of feed plate 70 may be used to control striation thickness. These layered ribbons may then be encapsulated within a continuous matrix of second polymer as described above.

Figure 6:
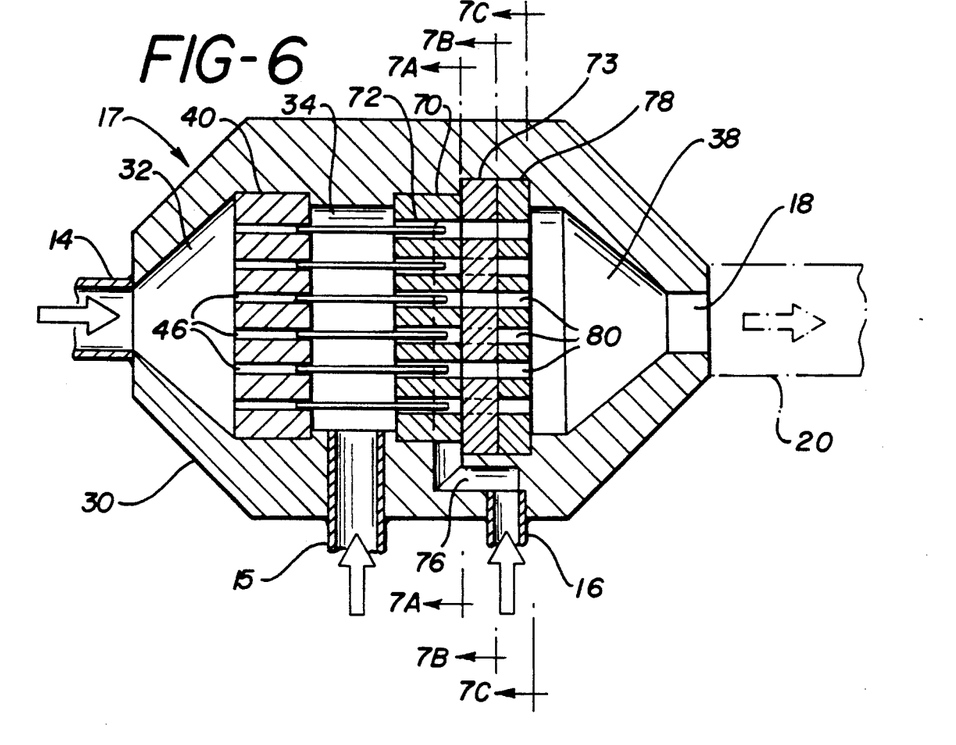
FIG. 6 is a side sectional view of a die suitable for the production of yet another embodiment of the polymeric body of the present invention.

In another embodiment of the invention illustrated in FIG. 6, where like reference numerals refer to like elements, the first polymeric material may be made to be discontinuous in all major planar directions of the body, producing layers of platelet-like elements in a continuous matrix of a second polymer. As shown in FIG. 6, a stationary feed plate 70 is positioned at the outlet end of passages 48. Reciprocating feed plate 73 (shown in FIG. 7B) is positioned behind stationary feed plate 70. Reciprocating feed plate 73 comprises a series of staggered openings which alternately communicate with either the encapsulated tubes of polymer from holes 72 or polymer from slots 74 in feed plate 70. A stationary plate 78 (shown in FIG. 7C), having rows of holes 80 is located behind reciprocating feed plate 73.

Figure 7A:
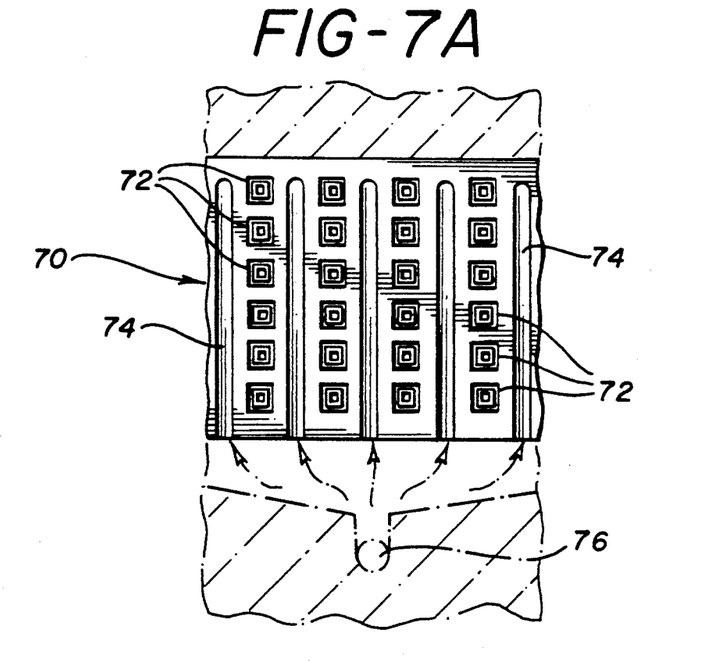
FIGS. 7A-7C are front views of the reciprocating feed plate taken along lines A—A, B—B, and C—C in FIG. 6.
Figure 7B:
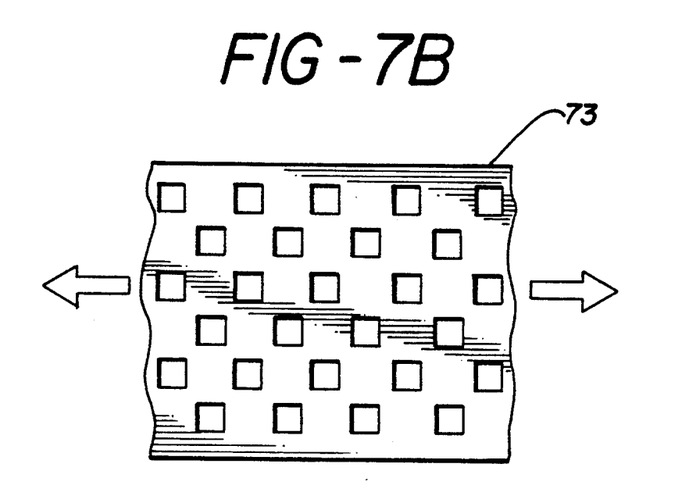
Figure 7C:
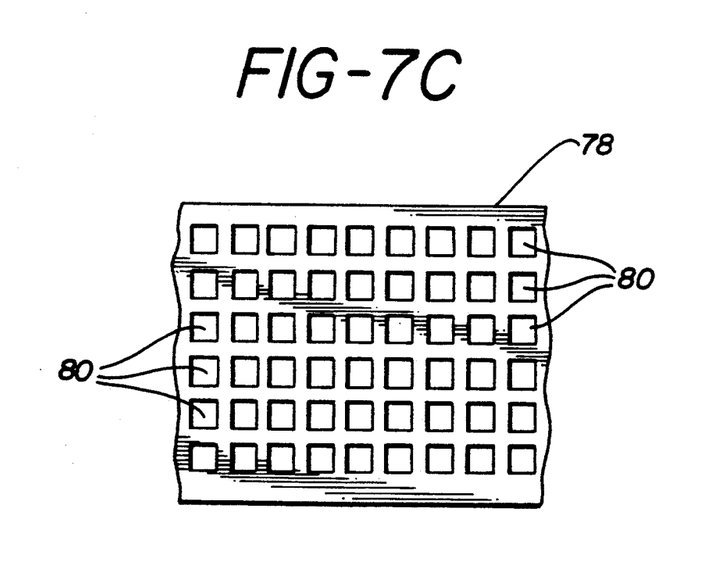

A first polymer is fed from plenum 32 into passages 46 and then encapsulated by a second polymer introduced through conduit 15 into intermediate plenum 34. At the outlet end of passages 48, rows of the first polymer encapsulated within the second polymer are alternately spaced between slots communicating with a third polymer source, where the third polymer may be the same as or different from the second polymer. As shown in FIGS. 7A-7C, stationary feed plate 70 comprises alternating rows of holes 72 and vertical slots 74. Holes 72 communicate with the first polymer stream encapsulated in the second polymer while slots 74 communicate with a source of third polymer (which can be the same as the second polymer) through conduit 76. Flow of the polymer through reciprocating plate 73 produces alternating "slugs" of encapsulated first polymer with a second or third polymer.

These discontinuous slugs then flow through manipulating section 20 where the number of layers is further multiplied, or directly to shaping die 22. The first polymer is deformed into discontinuous platelet-like elements within a matrix polymer. The encapsulating layer of the second polymer acts as a lubricating boundary layer so that the first polymer maintains substantially plug flow through the system.

Figure 8:
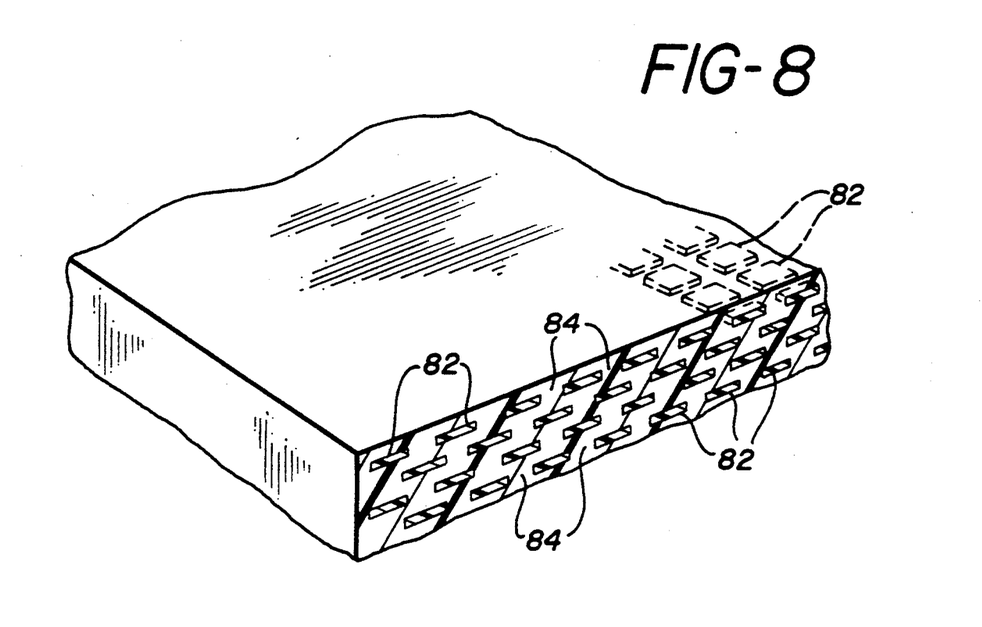
FIG. 8 is a perspective view of another embodiment of the polymeric body of the present invention as it emerges from a sheeting die.

The resulting polymeric body is illustrated in FIG. 8, with many layers of overlapping platelets 82 of the first polymer contained within a matrix 84 of the second polymer. As can be seen, the platelets are discontinuous along planes both parallel to and transverse to the major surfaces of the body.

The controlled platelet-like morphology produced by this embodiment of the invention has several utilities. Where the polymeric body produced is one which is reflective, light is reflected from the many interfaces of the overlapping platelets much like the scales of a silvery appearing fish.

Imperfect adhesion between the first and second polymers does not necessarily adversely affect the physical or optical properties of the body. For example, a polymeric reflective body prepared from a polystyrene (R.I. 1.59) matrix which contains platelets of polymethyl methacrylate (R.I. 1.49) does not catastrophically delaminate even though in a laminate having continuous layers of the two polymers, moderate flexing will produce delamination. Because of the continuous matrix of the second polymer, the body maintains its integrity.

Further, air, or other gases or liquids, may be introduced into the polymer melt forming the platelets. When cooled, such gases or liquids will come out of solution at the interface between the platelets and the matrix polymer to provide a very large refractive index mismatch (R.I. air=1.00). If the matrix polymer is elastomeric, the polymer making up the platelets can be nonelastomeric and yet the polymeric body will still possess elastomeric properties in all directions. The polymer used to form the platelets may be one which is a barrier to gases and/or liquids. The many layers of overlapping platelets may provide and excellent barrier to gases because of the tortuous path to gas permeation.

The platelets can themselves be multilayered either by feeding a microlayer stream of alternating layers of diverse polymers into plenum 32 or by positioning reciprocating feed plates or valves, as shown in FIG. 4 and FIG. 6, at both the inlet and outlet ends of passages 46. The method of the present invention uniquely provides for controlled placement and dispersion of one component in a continuous matrix of another. The size and placement of the platelets is managed by the mechanical means described above.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A lamellar reflective polymeric body of at least first and second diverse polymeric materials, said body having at least first and second major surfaces, the body comprising a plurality of discontinuous layers of said first polymeric material within a matrix of said second polymeric material, and wherein said discontinuous layers of said first polymeric material have their major interfaces aligned substantially parallel to the major surfaces of said body, the number of layers of said first polymeric material being sufficient such that at least 30% of light incident on said body is reflected, the individual layers of said first polymeric material in said body, and those portions of said second polymeric material sandwiched between said individual layers of said first polymeric material, having an optical thickness of not more than 0.09 micrometers, between 0.09 micrometers and 0.45 micrometers, or not less than 0.45 micrometers, and wherein said first and second polymeric materials differ from each other in refractive index by at least about 0.03.

2. The reflective polymeric body of claim 1 in which said first polymeric material is polymethyl methacrylate and said second polymeric material is polystyrene.

3. The reflective polymeric body of claim 1 in which said second polymeric material is elastomeric.

4. The reflective polymeric body of claim 1 in which both of said first and second polymeric materials are elastomeric.

5. The reflective polymeric body of claim 1 in which a fluid is present at a plurality of said major interfaces of said first and second polymeric materials.

6. The reflective polymeric body of claim 1 in which said first polymeric material is a gas barrier material.

7. The reflective polymeric body of claim 1 in which at least a portion of the layers of said first polymeric material have an optical thickness of between 0.09 micrometers and 0.45 micrometers and produces a colored, iridescent body.

8. The reflective polymeric body of claim 1 in which said polymeric body is thermoformable.

9. The lamellar reflective body of claim 1 wherein said layers of said first polymeric material are substantially continuous in a first plane parallel to one of said major surfaces of said body and discontinuous in a second plane transverse to said first plane.

10. The lamellar reflective body of claim 1 wherein said layers of said first polymeric material are substantially discontinuous along planes parallel and transverse to one of said major surfaces of said body.

11. The reflective polymeric body of claim 1 in which a coloring agent is incorporated into at least one layer of said polymeric body.

12. The reflective polymeric body of claim 11 in which said coloring agent is selected from the group consisting of pigments and dyes.

13. The reflective polymeric body of claim 11 in which said coloring agent is incorporated into at least one interior layer of said polymeric body.

14. The reflective polymeric body of claim 1 in which at least 75% of said individual layers of said first polymeric material and those portions of said second polymeric material sandwiched therebetween have an optical thickness of at least 0.45 micrometers.

15. A lamellar reflective polymeric body of at least first and second diverse polymeric materials, said body having at least first and second major surfaces, the body comprising a plurality of discontinuous individual layers within a matrix of a third polymeric material, each discontinuous individual layer comprising a plurality of alternating layers of said first and second polymeric materials within said matrix, and wherein said alternating layers of said first and second polymeric materials have their major interfaces aligned substantially parallel to the major surfaces of said body, the number of alternating layers of said first and second polymeric materials being sufficient such that at least 30% of light incident on said body is reflected, the individual layers of said first and second polymeric materials having optical thicknesses of not more than 0.09 micrometers, between 0.09 micrometers and 0.45 micrometers, or not less than 0.45 micrometers, and wherein said first and second polymeric materials differ from each other in refractive index by at least about 0.03.

16. The reflective polymeric body of claim 15 in which said third polymeric material is elastomeric.

17. The reflective polymeric body of claim 15 in which said first, second, and third polymeric materials are elastomeric.

18. The reflective polymeric body of claim 15 in which at least a portion of the layers of said first polymeric material have an optical thickness of between 0.09 micrometers and 0.45 micrometers and produces a colored, iridescent body.

19. The reflective polymeric body of claim 15 in which said polymeric body is thermoformable.

20. The lamellar reflective body of claim 15 wherein said layers of said first and second polymeric materials are substantially continuous in a first plane parallel to one of said major surfaces of said body and discontinuous in a second plane transverse to said first plane.

21. The lamellar reflective body of claim 15 wherein said layers of said first and second polymeric materials are substantially discontinuous along planes parallel and transverse to one of said major surfaces of said body.

22. The reflective polymeric body of claim 15 in which a coloring agent is incorporated into at least one layer of said polymeric body.

23. The reflective polymeric body of claim 22 in which said coloring agent is selected from the group consisting of pigments and dyes.

24. The reflective polymeric body of claim 22 in which said coloring agent is incorporated into at least one interior layer of said polymeric body.

25. The reflective polymeric body of claim 15 in which at least 75% of said individual layers of said first and second polymeric materials have an optical thickness of at least 0.45 micrometers.

26. A lamellar polymeric body of at least first and second diverse polymeric materials, said body having at least first and second major surfaces, the body comprising a plurality of layers of said first polymeric material within a matrix of said second polymeric material, and further wherein said layers of said first polymeric material are substantially discontinuous along planes parallel and/or transverse to one of said major surfaces of said body.

27. The polymeric body of claim 26 in which said first polymeric material is rubbery and said second polymeric material is brittle.

28. The polymeric body of claim 26 wherein said first polymeric material is a gas barrier material.

* * * * *